United States Patent [19]
Elliott et al.

[11] Patent Number: 5,974,249
[45] Date of Patent: Oct. 26, 1999

[54] ZERO FOOTPRINT METHOD AND APPARATUS FOR EXPANDING ALLOCATED MEMORY SPACE OF A PROCESS USING A VIRTUAL MEMORY AREA

[75] Inventors: Scott Elliott, Beaverton; John D. Teddy, Tigaro, both of Oreg.

[73] Assignee: Symantec Corporation, Cupertino, Calif.

[21] Appl. No.: 08/823,675

[22] Filed: Mar. 24, 1997

[51] Int. Cl.$^6$ ..................................................... G01R 31/28
[52] U.S. Cl. .............................. 395/500.48; 395/183.11; 395/183.14; 395/704
[58] Field of Search ..................................... 395/500, 571, 395/580, 183.11, 183.13, 183.14, 185.01, 185.02, 591, 500.48, 701, 677, 200.43, 704; 371/19, 27

[56] References Cited

U.S. PATENT DOCUMENTS

| | | | |
|---|---|---|---|
| 5,335,344 | 8/1994 | Hastings | 395/575 |
| 5,515,493 | 5/1996 | Boston et al. | 395/157 |
| 5,526,485 | 6/1996 | Brodsky | 395/183.14 |
| 5,559,980 | 9/1996 | Connors et al. | 395/427 |
| 5,581,697 | 12/1996 | Gramlich et al. | 395/183.11 |
| 5,815,702 | 9/1998 | Kannan et al. | 395/591 |

*Primary Examiner*—Kevin J. Teska
*Assistant Examiner*—Thai Phan
*Attorney, Agent, or Firm*—Fliesler, Dubb, Meyer & Lovejoy; Gideon Gimlan

[57] ABSTRACT

The invention is an apparatus and computer method for controlling the operation of a computer running under an operating system such as WINDOWS® 95 and WINDOWS® NT operating system, or their like, that do not require a footprint in the programs running under the operating system. A program, hereinafter referred to as CrashGuard™, is stored and installed in a computer thereby being established as the "debugger" in the user's systems. Once so established CrashGuard™ may be stored elsewhere then the computer memory. Whenever a fatal error occurs the "Just in Time" debugging facility of the WINDOWS® 95 and WINDOWS® NT operating system, or their like, will suspend the target program, will load CrashGuard™ as the designated "debugger" into memory space not allocated to the target program, identifies the target program to CrashGuard™ and executes CrashGuard™. CrashGuard™ will cause additional memory space to be added to the virtual memory of the target program. Thereafter CrashGuard™ will store into the additional memory space a routine that will allow the user to take such actions as to execute a Save or Save As command thereby not losing data that would otherwise have been lost.

40 Claims, 4 Drawing Sheets

ZERO FOOTPRINT METHOD AND APPARATUS FOR EXPANDING ALLOCATED MEMORY SPACE OF A PROCESS USING A VIRTUAL MEMORY AREA

BACKGROUND OF THE INVENTION

1. Field of the Invention

The present invention generally relates to a computer method and apparatus for modifying the allocated memory space assigned to a program running under control of an operating system. More particularly, the invention relates to a computer method and apparatus for expanding the memory space presently allocated to a program running under WINDOWS® 95 or NT (registered Trademark of Microsoft Corporation)operating systems while requiring a zero footprint in programs running under WINDOWS® 95 or NT operating systems, or their like.

2. Description of the Related Art

There are instances, such as in a debugging program, that it is desirable to add instructions to a program running under WINDOWS® 95 and NT operating systems, or their like. However under the architecture of WINDOWS® 95 and NT operating systems, or their like, a program is allocated memory space in memory referred to as a virtual memory. Further to allow multiprocessing of programs resources are allocated to a program which are referred to as a virtual processor. The virtual processor includes a series of programmable registers, including but not limited to programmable register commonly referred to as registers eip, esp, eax, ebx and ecx which are used by the operating system in executing the program. The state of the programmable registers is commonly referred to as the context of the program.

WINDOWS® 95 and WINDOWS® NT operating systems, or their like, includes a "Just In Time" (JIT) debugging facility which detects fatal error occurring in programs presently being processed. Upon the occurrence of a fatal error JIT will stop the program and collect data about the status of the program and the virtual processor running the program experiencing the fatal error (hereinafter referred to as a target program). The user has no choice but to exit the target program thereby losing any updated data that had not previously been stored.

There are debugging programs designed to prevent errors within WINDOWS® 95 and WINDOWS® NT programs from causing the target program from being immediately terminated. These debugging programs achieve this end by intercepting all errors and exceptions within the running programs, which in turn requires code associated with the debugging program (a debugging footprint) to be loaded into all programs before the programs are executed. The loading of the code associated with the debugging programs has been accomplished by the use of virtual device drivers (Vxd) and by the use of system hooks. Although the hooks pose the greatest risk, debugging programs have the drawback that they must load code into every program and the code might actually cause malfunctions in the programs that they are supposed to protect.

It is known that additional code can be loaded into a program by the library function (LoadLibrary) which implicitly expands the program's virtual memory. However the library function requires interaction with the program and where the program has incurred a fatal error, the use of the library function poses unknown risk one of which could be a system shutdown destroying not only the data of the crashed program but of all other program being run under the operating system.

SUMMARY OF THE INVENTION

It is an object of the present invention to provide a computer method and apparatus that does not require a computer footprint in the programs running under WINDOWS® 95 or WINDOWS® NT, or their like, to facilitate the expansion of the memory space allocated to such a program.

It is another object of the present invention to provide a computer method and apparatus that do not require a computer footprint in the programs running under WINDOWS® 95 and WINDOWS® NT, or their like, and which prevent errors within such a program from causing that program from being immediately terminated.

It is another object of the present invention to provide a computer process and apparatus that do not require any action by the program's original code for adding memory space to the program's virtual memory.

Briefly the invention is an apparatus and computer method for controlling the operation of a computer running under an operating system such as WINDOWS® 95 and WINDOWS® NT operating system, or the like, that do not require a footprint in the programs running under the operating system. A program, hereinafter referred to as CrashGuard™, is stored and installed in a computer thereby being established as the "debugger" in the user's systems. Once so established CrashGuard™ may be stored elsewhere then the computer memory. Whenever a fatal error occurs Just in Time debugging facility of the WINDOWS® 95 and WINDOWS® NT operating system, or their like, will suspend the target program, will load CrashGuard™ as the designated "debugger" into memory space not allocated to the target program, identifies the target program to CrashGuard™ and executes CrashGuard™. CrashGuard™ will cause additional memory space to be added to the virtual memory of the target program. Thereafter CrashGuard™ will store into the additional memory space a routine that will allow the user to take such actions as to execute a Save or Save As command thereby not losing data that would otherwise have been lost.

An advantage of the invention is that CrashGuard™ need not be loaded into memory unless needed.

Another advantage of the invention is that memory space is not used to store a debugger footprint in any program stored in memory.

BRIEF DESCRIPTION OF THE DRAWINGS

The invention will be described with respect to the particular embodiments thereof and references will be made to the drawings, in which.

DETAILED DESCRIPTION OF THE INVENTION

Figure 1:
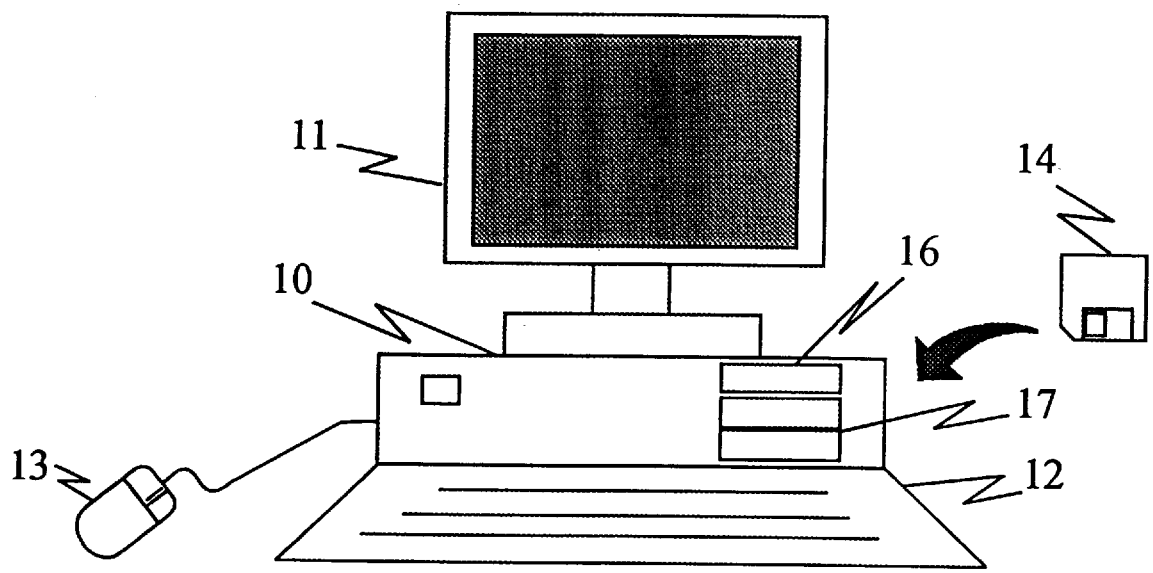
FIG. 1 illustrates a computer system embodying the present invention.
Figure 6:
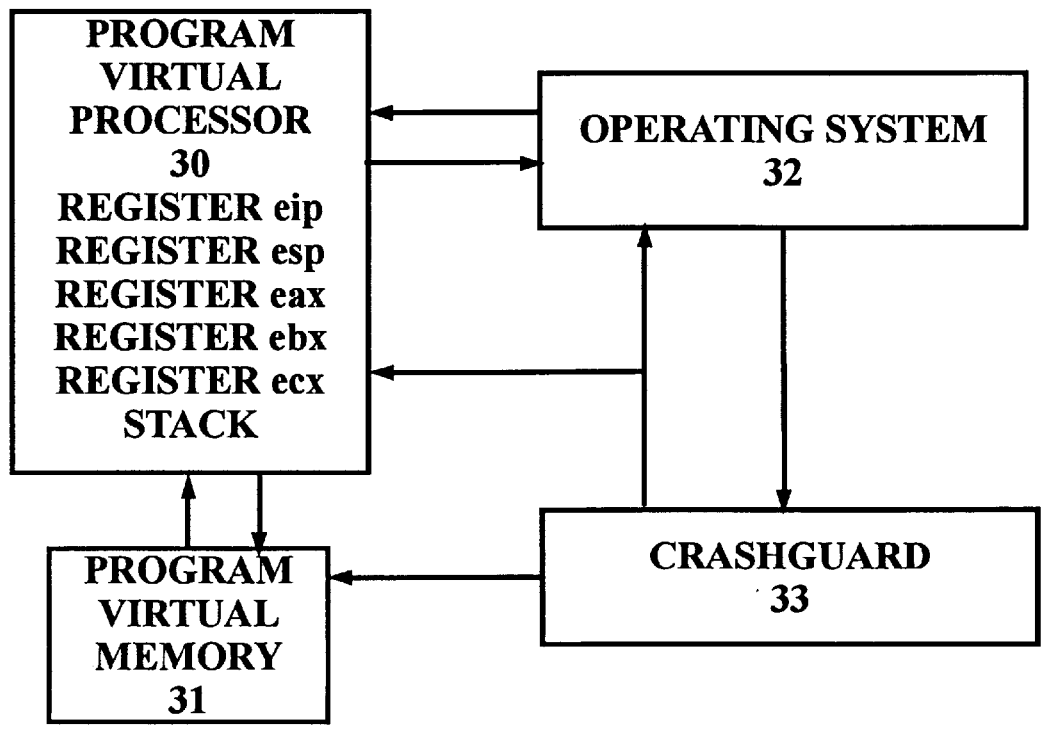
FIG. 6 is an illustration showing the interaction between the operating system, the program's virtual processor and memory and CrashGuard™.

Referring to FIGS. 1 and 6, a computer system is shown comprised of a mouse 13, a display 11 and a keyboard 12 and a computer 10 which includes a floppy disk drive 16, a hard disk drive 17 and a random access memory 15 (not shown in FIG. 1). The computer 10 is operating under the control of WINDOWS® 95 or WINDOWS® NT operating system 32. Under the architecture of WINDOWS® 95 and WINDOWS® NT operating systems 32, or their like, a program is allocated memory space in memory referred to as a virtual memory 30. Further to allow multiprocessing of programs resources are allocated to a program which are referred to as a virtual processor 31. The virtual processor 31 includes a series of programmable registers, including but not limited to programmable register commonly referred to as registers eip, esp, eax, ebx and ecx which are used by the operating system 32 in executing the program. The state of the programmable registers is commonly referred to as the context of the program or the program's context.

WINDOWS® 95 and WINDOWS® NT operating systems 32, or their like, includes a "Just In Time" (JIT) debugging facility which detects fatal error occurring in programs presently being processed. Upon the occurrence of a fatal error JIT will stop the program (hereinafter referred to as the target program) and then collects data about the status of the target program and the virtual processor 30 (i.e., the program context) running the program experiencing the fatal error.

Disk 14 is a magnetic disk widely used in the computer industry to store programs and data. Disk 14 has recorded thereon a debugging program, hereinafter referred to as CrashGuard™ 33. When disk 14 is inserted into floppy disk drive 16, computer 10 has the ability to coact with CrashGuard™ 33 stored upon disk 14 so as to control the operation of computer 10. Computer 10 may transfer CrashGuard™ 33 to be stored onto hard disk drive 17 or into the random access memory (RAM) 15 of computer 10 thereby allowing disk 14 to be removed from the floppy disk drive 16. While CrashGuard™ 33 was described as being recorded upon a floppy disk, CrashGuard™ 33 may be recorded onto any recording medium ( i.e. magnetic tape, magnetic cards, optical disc or, tape or card, flash memory units, semiconductor memories) that may be used as a memory unit for a computer system running under WINDOWS® 95 or WINDOWS® NT operating system 32.

Figure 3:
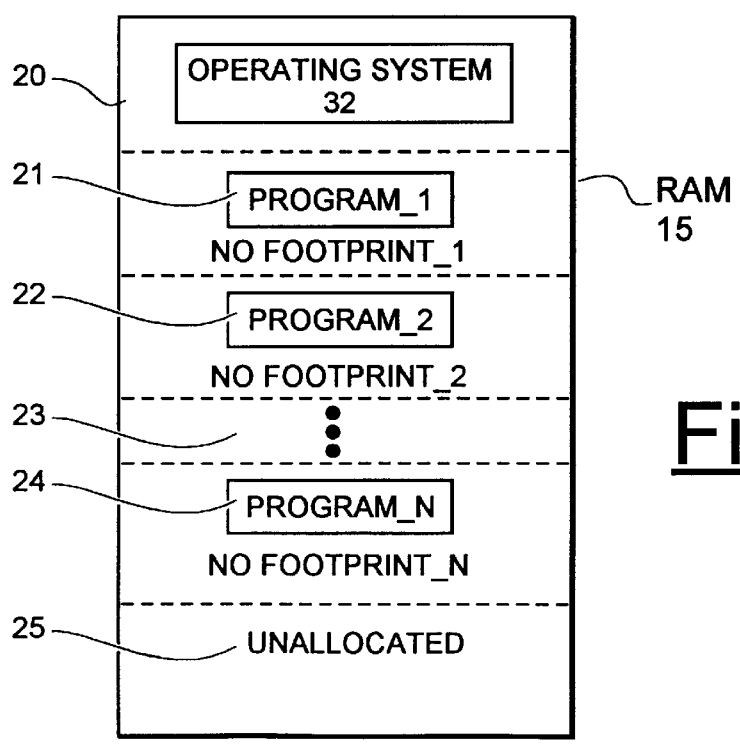
FIG. 3 illustrates a computer memory without a debugger footprint being stored in every program.

FIG. 3 illustrates the RAM 15 having stored therein the operating system 32 stored in virtual memory 20, programs 1 through N stored in virtual memories 21, 22, 23 and 24 and unallocated memory space 25.

Figure 2:
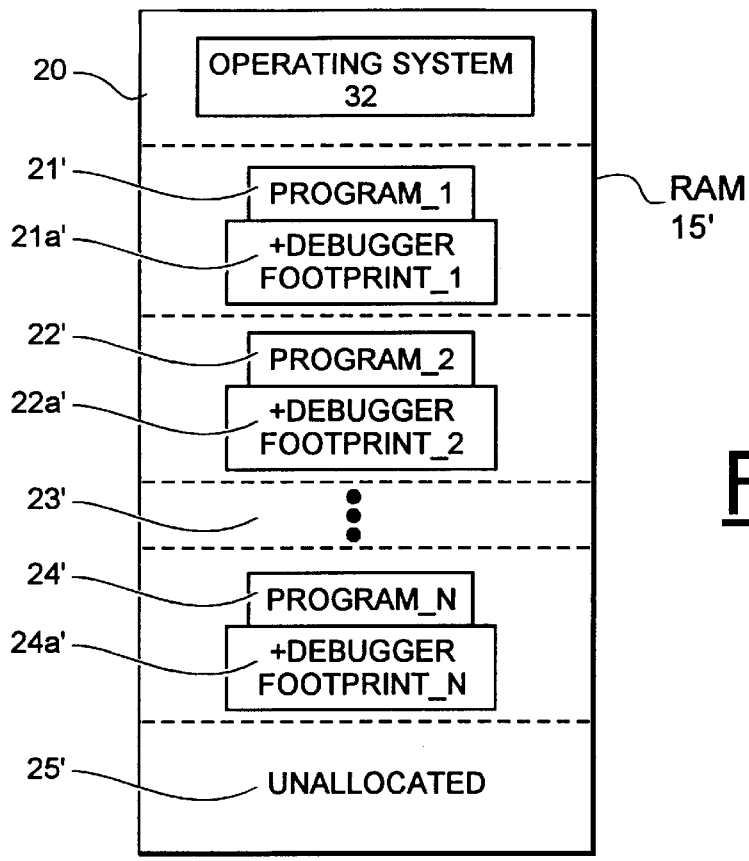
FIG. 2 illustrates a computer memory wherein a debugger footprint is stored in every program.

FIG. 2 illustrates RAM 15 having stored therein the operating system stored in virtual memory 20, program 1 through N each having a debugger footprint 21a through 24a stored in virtual memories 21, 22, 23 and 24 and unallocated memory space 25.

When CrashGuard™ 33 is first installed in computer 10, CrashGuard™ 33 is designated as the "debugger" associated with the JIT debugging facility of WINDOWS 95® and WINDOWS NT® operating system 32. CrashGuard™ 33 acts as a tool within the WINDOWS® 95 or WINDOWS® NT operating system 32 and when called by JIT is stored in its own virtual memory of RAM 15 and thereby isolated from the virtual memory for the target program. As such CrashGuard™ 33 can modify target program instructions stored in the virtual memory 31 for the target program but cannot add additional memory space to the virtual memory 31 allocated to the target program.

Figure 5:
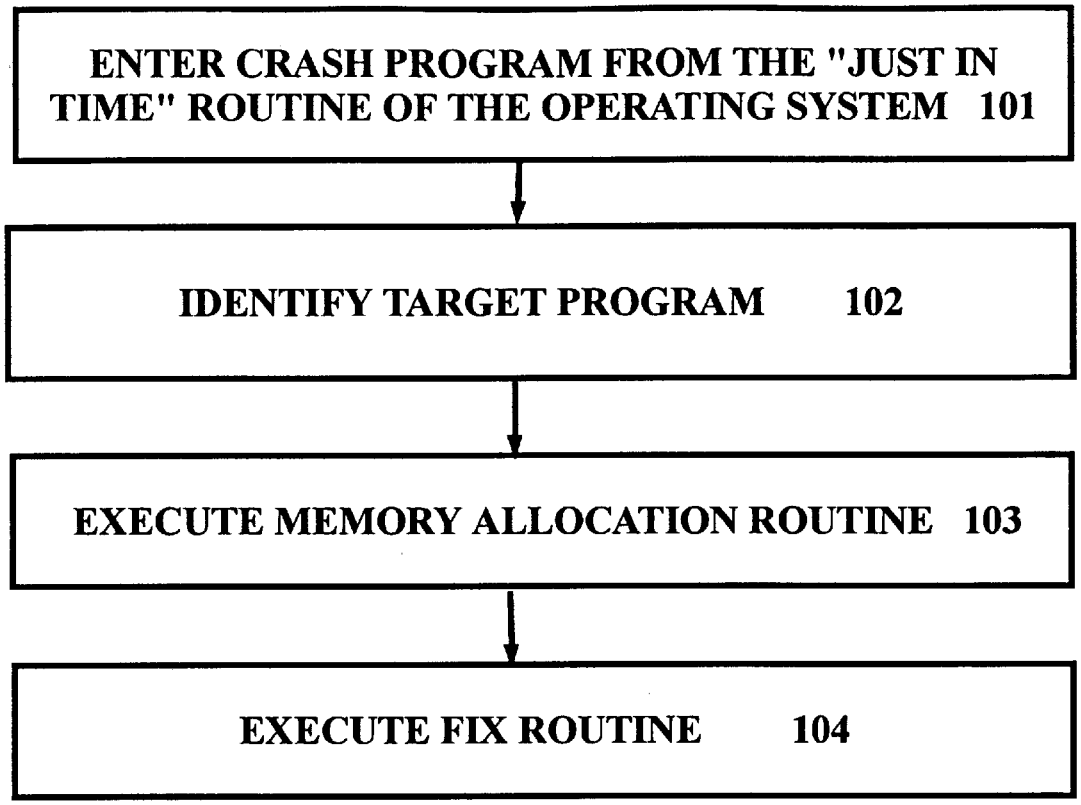
FIG. 5 is a flow chart illustrating the operation of CrashGuard™.

Referring to FIG. 5, prior to step 101 JIT will have stopped and identified the target program in response to JIT detecting a fatal error in the target program.

In step 101 JIT calls CrashGuard™ 33 into RAM 17 and initiates execution of CrashGuard™ 33.

In step 102, CrashGuard™ 33 will acquire the identity of the target program.

In step 103, CrashGuard™ 33 will execute a memory allocation routine for allocating additional memory space to the target program's virtual memory 31. In order for this to be accomplished, the routine will alter the target program and then resumes execution the target program such that the target program will cause the additional memory space to be allocated to the target program,s virtual memory 31. One such memory allocation routine, hereinafter referred to as "ROUTINE A", will store the status of the target program and the program context (the values in the programmable registers of the virtual processor assigned to the target program). Next, ROUTINE A will identify the location of the first n bytes of the target program stored in the virtual memory 31 assigned to the target program and will copy first n bytes of the target virtual memory 31 to be temporarily stored. It has been noted that the first few bytes in most program are relatively inactive after the programs has been initiated and therefore little damage will be caused to the program if these bytes are temporarily changed. In practice the ROUTINE A only uses the first 11 bytes of the target program.

ROUTINE A will then write the following instructions into the first 11 bytes of virtual memory 31 for the target program:

| | |
|---|---|
| push ecx | Record the number of bytes needed |
| push 0 x 40 | Record the type of memory as global |
| call eax | Call Globelalloc{} to allocate memory |
| mov ebx,0 x 4B4F2D41 | put arbitrary value in ebx to verify |
| int 3 | return to debugger (ROUTINE A) |

ROUTINE A then adjusts the target program's context by placing the address of the first instruction of the memory allocation routine in the target program's register eip so that, when the target program resumes execution, the target program will start at the first instruction of that ROUTINE A stored in the target program. The context is adjusted such that register ecx contains the number of additional bytes of memory to be allocated to the virtual memory 31 of the target program and register eax contains the address of the system GlobalAlloc memory allocating function.

ROUTINE A then causes the target program to begin executing the ROUTINE A's instructions which are now a part of the target program. These instructions will store the number of bytes requested, the type of memory request (global) and will then will call the system GlobalAlloc memory allocating function which will allocate the amount and type of additional memory to the virtual memory 31 for the target program. When system GlobalAlloc memory allocating function returns after completing its task, register eax will contain the start address of the additional memory allocated to the virtual memory 31 for the target program. The move instruction is next executed which places an arbitrary value ( herein corresponding to the message "A-OK" into register ebx to indicate that the system GlobalAlloc memory allocating function has been completed.

Finally an interrupt 3 (DebugBreak) is issued which is interrupted as a fatal error by the JIT. JIT will stop the target program and will transferred control over ROUTINE A of CrashGuard™ which is already loaded into RAM memory 15. ROUTINE A will recognized the interrupt 3 as the DebugBreak scheduled in the memory allocation routine store in the target program.

Upon sensing the occurrence of the interrupt, ROUTINE A checks register ebx for the arbitrary value indicated in the ROUTINE A's instructions stored into the target program. If the arbitrary value in register ebx is correct, Routine A reads and stores the starting address of the added memory from register eax of the virtual processor 30 of the target program and stores it in a programmable register of the virtual processor for CrashGuard™. ROUTINE A then store the original 11 bytes of the target program back into the first 11 bytes of the target program thereby removing ROUTINE A's instructions from the target program and returning the target program to the target program's original state. Optionally the original context of the virtual processor 30 may be restored.

An alternative memory allocation routine, hereinafter referred to as ROUTINE B, modify's the target program's stack to directly call the system GlobalAlloc memory allocating function. ROUTINE B identifies the target program's stack and adds the following to the target program's stack:

| 0 × BFF76693 | address of DebugBreak function |
| 0 × 40 | type of memory (global) |
| 62 | number of additional bytes of memory |

ROUTINE B modifies the eip register of the target's virtual processor 30 so as to call the system GlobalAlloc memory allocating function when the target program resumes execution and modifies the esp register (stack pointer) of the target's virtual processor 30 to point to the values that had been added to the target's stack in the target's virtual processor 30. When the target program is caused to resume execution, the target program will cause the system GlobalAlloc memory allocating function to be initiated which will read the type of memory and the amount of memory from the target program stack. The system GlobalAlloc memory allocating function will then allocate the addition type and amount of memory space to the target program's virtual memory 31 and the target program's register eax will have the starting address of the newly allocated memory. However when the system GlobalAlloc memory allocating function is complete it will point to the DebugBreak function and not the target program which would normally be the case. The DebugBreak function is an interrupt 3 which is interrupted as a fatal error by the JIT. JIT will stop the target program and will transfer control over to ROUTINE B of CrashGuard™ which is already loaded into RAM memory 15. ROUTINE B will recognize the interrupt 3 as the DebugBreak scheduled in the system GlobalAlloc memory allocating function processed by the target program.

Figure 4:
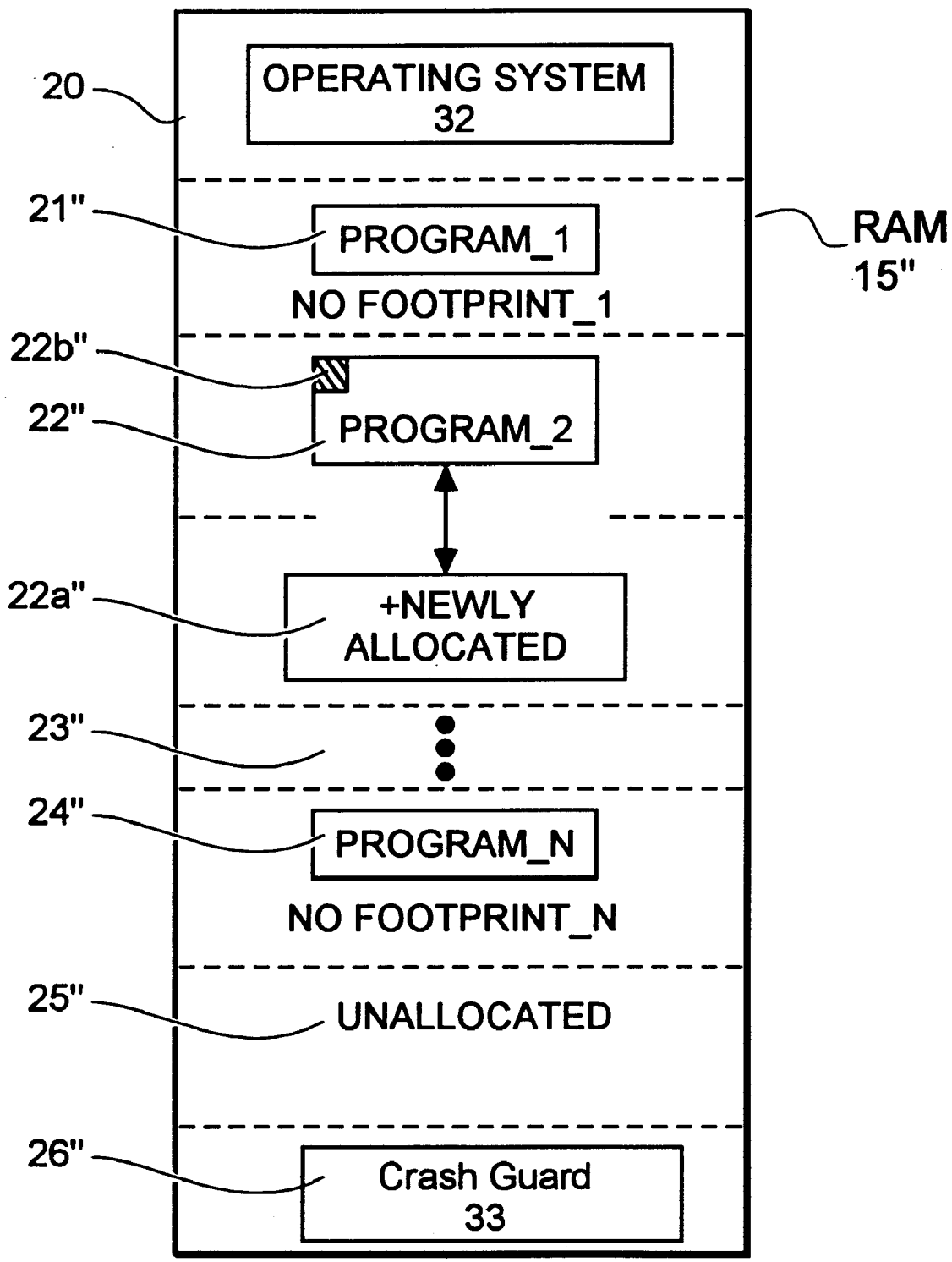
FIG. 4 illustrates a computer memory wherein newly allocated memory space has been allocated to program 2 by the invention.

Referring to FIG. 4, memory 15 is shown with the additional memory space having been allocated, for example, to Program 2 in accordance with the invention. The amount of additional memory space allocated is arbitrary and should be sufficient to store within the target program that code necessary to perform the desired function of that code. While the application of adding memory to a target program virtual memory was described in a debugging program environment, it will be realized by those skilled in the art of programming for WINDOWS® 95 or WINDOWS® NT operating system that the computer method and apparatus herein disclosed may be adapted to add memory to an existing program virtual memory for other purposes than for debugging.

In step 104, CrashGuard™ now can effectively write a fix routine into the new memory space of the virtual memory 31 for the target program without overwriting any instructions of the target program. Once the fix routine has been stored into the virtual memory 31 of the target program, CrashGuard™ will store the starting address of the fix routine into register eax of the target program's virtual processor 30 and will start the target program to execute instructions starting with the first instruction of the fix routine. In essence the target program is now executing the fix routine as part of the target program.

A fix routine that will restore a degree of control over the target (crashed) program is as follows:

| Get Message | User selects function by keyboard or mouse such as Save or SAVE AS |
| Dispatch Message | System performs requested function |
| Quit Message | User initiated |
| Exit Process | End routine |

This fix routine will allow the user to save the users data and quit the target program.

For a 16 bit processor the system should be rebooted and for a 32 bit processor it is recommended that the system be rebooted and if not rebooted the program should be exited and the restarted.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. An instructing apparatus, operatively couplable to a data processing machine which is operating under control of a multi-tasking operating system, where said operating system creates a virtual processor and a virtual memory for each of plural, multi-tasked programs controlled by said operating system, said instructing apparatus being for defining and conveying instructions to said data processing machine upon coupling therewith, where said data processing machine includes randomly addressable memory, said defined and conveyed instructions being for assigning additional memory space to the virtual memory assigned to a to-be-identified, target program without requiring execution of any original instructions of said target program; said apparatus comprising:

a plurality of instruction means for instructing said data processing machine to perform operations, the plurality of instruction means including:

(a) first instruction means for instructing said data processing machine to identify said target program;

(b) second instruction means for instructing said data processing machine to enter alterations into at least one of said virtual memory and said virtual processor of the identified target program, where said alterations will, when acted upon, cause said identified target program to itself request additional memory space for said virtual memory of said identified target program from said operating system; and (c) third instruction means for instructing said data processing machine to resume processing of said altered target program, said resumption including acting upon said entered alterations and including thereafter stopping said altered target program after said operating system has allocated said additional memory space to said virtual memory of said target program.

2. The instructing apparatus of claim 1 wherein said plurality of instruction means further comprises:
(d) fourth instruction means for instructing said data processing machine to store an additional instruction set into said additional memory space in said virtual memory of said target program.

3. The instructing apparatus of claim 2 wherein said plurality of instruction means further comprises:
(e) fifth instruction means for instructing said data processing machine to resume the processing of said target program beginning with said additional instruction set stored into said additional memory space allocated to said virtual memory of said target program.

4. The instructing apparatus of claim 1 further comprising a recording medium wherein said plurality of instruction means are defined as instructional signals recorded on said recording medium.

5. The apparatus of claim 4 wherein the recording medium is selected from the group consisting of a magnetically encoded disk, an optically encoded disk, a magnetic tape and a read only memory device.

6. In further combination with the instructing apparatus of claim 4, an instruction signal conveying means, engageable with said instructing apparatus and coupled to said data processing machine for supplying instructions to said data processing machine as electrical or optical signals representing said first, second and third instruction means.

7. The combination of claim 6 wherein said instruction signal conveying means includes means selected from the group consisting of a disk drive, a tape drive, and a Read Only Memory cartridge reader.

8. The apparatus of claim 1 wherein said alterations include alterations entered into both the virtual memory and virtual processor of the identified target program and further wherein:
said second instructing means comprises:
(b1) fit means for instructing said data processing machine to identify a starting location of said virtual memory of said identified target program;
(b2) second means for instructing said data processing machine to temporarily save the first n bytes of original instructions of said identified target program, said first n bytes being originally stored beginning at the starting location in said virtual memory of said identified target program and n being a whole number; and
(b3) third means for instructing said data processing machine to write a set of new instructions in said first n bytes of said virtual memory of said identified target program, wherein said set of new instructions will request additional memory space for said virtual memory of said identified target program when said set of new instructions is executed; and
said third instruction means further comprises:
(c1) fit means for instructing said data processing machine to store in a program counter of said virtual processor of said target program, said starting location of said virtual memory as identified by execution of the instructions of said third means (b3);
(c2) second means for instructing said data processing machine to initiate the processing of said set of new instructions written into said virtual memory of said target program; and
(b3.1) wherein said set of new instructions include an instruction for instructing said data processing machine to stop said target program after said operating system has assigned said additional memory space to said virtual memory of said target program.

9. The apparatus of claim 1 wherein said alterations include alterations entered into the virtual processor of the identified target program and further wherein:
said second instructing means comprises:
(b1) first means for instructing said data processing machine to identify an add-on location of a stack portion of said virtual processor for said identified target program;
(b2) second means for instructing said data processing machine to add on to said add-on location of said stack, first data representing a predefined amount of said additional memory space that is to be allocated and second data representing a predefined type of memory for said additional memory space that is to be allocated to said virtual memory of said program and third data representing a return-from-call pointer that points to an interrupt function that will cause said program to stop instead of continuing in said target program after a calling branch is made from said target program to a memory allocation routine; and
said third instruction means further comprises
(c1) first means for instructing said data processing machine to store in a program counter of said virtual processor, an address of said memory allocation routine;
(c2) second means for instructing said data processing machine to store in said virtual processor of said target program a stack pointer pointing to the data stored in said stack of said virtual processor of said target program by execution of said instructions of the second means (b2) of the second instructing means;
(c3) third means for instructing said data processing machine to initiate the processing of said memory allocation routine; and
(b2.1) wherein the presence of said third data in the stack portion of said virtual processor for said identified target program causes a stopping of said target program after said memory allocation routine executes.

10. A computer method for allocating additional memory space to a virtual memory of a target program, where said target program operates under control of a multi-tasking operating system and where said operating system allocates to each respective one of plural, multi-tasked programs running under the operating system, a respective virtual processor and a respective virtual memory, wherein said plural multi-tasked programs include the target program, said computer method comprising the steps of:
(a) identifying said target program;
(b) while the identified target program is stopped after having started at least once, altering at least one of the virtual memory and virtual processor of said stopped target program such that upon restart, the target program will request additional memory space for its respective virtual memory from said operating system;
(c) restarting the altered target program so that said request for additional memory space will be made; and (d) stopping said restarted program after said additional memory space has been allocated to said virtual memory of said target program by said operating system.

11. The computer method of claim 10 further comprising the step of:
(e) storing executable code in said additional memory space allocated to said virtual memory of said target program.

12. The computer method of claim 11 further comprising the step of:
(f) resuming execution of said target program beginning with said executable code stored into said additional memory space allocated to said virtual memory of said target program.

13. The computer method of claim 10 wherein said step b further comprises the steps of:
(b1) identifying the starting location of said virtual memory of said target program;
(b2) temporarily saving a plurality of a first n bytes of original instructions of said target program which are originally stored in said virtual memory of said target program; and
(b3) storing a set of new instructions in said first n bytes of said virtual memory of said target program, wherein said set of new instructions will request additional memory space for said virtual memory of said target program when said set of new instructions is executed;
said step c further comprises the steps of:
(c1) storing in said virtual processor of said target program said address of a first instruction of said set of new instructions stored in said virtual memory of said processor;
(c2) initiating the processing of said set of new instructions in said virtual memory of said target program; and
said step d further comprises the steps of:
(d1) stopping said target program after said operating system has assigned said additional memory space to said virtual memory of said target program with a starting address of said allocated memory space stored in said virtual processor of said target program; and
(d2) restoring said first n bytes of said original instructions of said target program in said first n bytes of memory storage in said virtual memory of said target program.

14. The computer method of claim 10 wherein said step b further comprises the steps of:
(b1) identifying the starting location of a stack of said virtual processor of said target program:
(b2) storing in said stack, first data indicating an amount of additional memory space to be allocated, second data indicating a type of memory to be allocated additionally to said virtual memory of said target program and third data representing a pointer to an interrupt function that, when invoked, will cause said program to stop; and
said step c further comprises the steps of:
(c1) storing the address of a memory allocation function of said operating system that allocates memory to said virtual memory of said target program in said virtual processor of said target program; and
(c2) storing in said virtual processor of said program a stack pointer pointing to said data stored in said stack of said virtual processor of said program step b2;
(c3) resuming processing said target program where said program will initiate the processing of said memory allocation function of said operating system which will allocate said amount and type of said additional memory space function stored in said stack of said virtual processor of said target program.

15. A machine-implemented method for execution under an operating system that assigns respective virtual memories and respective virtual processors to respective ones of plural, multi-tasked programs that execute under supervision of the operating system, said method comprising the steps of:
(a) identifying one of said multi-tasked programs as a target program to whose respective virtual memory, additional memory space is to be added;
(b) using a second of said multi-tasked programs as a control program that alters at least one of the virtual memory and virtual processor of the target program such that a subsequent execution of the target program will cause the respective target program to itself request allocation of the additional memory space to the respective virtual memory of the target program, where said subsequent execution uses at least one of the altered virtual memory and virtual processor; and
(c) invoking said subsequent execution of the target program and thereby causing the target program to itself request allocation of the additional memory space to its own virtual memory.

16. The machine-implemented method of claim 15 wherein:
(a.1) said step of identifying the target program is in response an indication that target program has experienced a fatal error.

17. The machine-implemented method of claim 15 wherein:
(a.1) said step of identifying the target program is carried out by a Just In Time (JIT) debugging facility of the operating system.

18. The machine-implemented method of claim 17 wherein:
(a.2) said JIT debugging facility causes the control program to be stored into a respective virtual memory as a debugger of the identified target program.

19. The machine-implemented method of claim 15 wherein:
(b.1) said alteration of at least one of the virtual memory and virtual processor of the target program occurs while the target program is stopped for a first time.

20. The machine-implemented method of claim 19 wherein:
(b.2) said alteration of at least one of the virtual memory and virtual processor of the target program causes the target program to stop for a second time after said invocation of the subsequent execution causes the target program to itself request allocation of the additional memory space to its own virtual memory.

21. The machine-implemented method of claim 15 wherein:
(b.1) said alteration of at least one of the virtual memory and virtual processor of the target program causes a recording onto a stack portion of the target's virtual processor of a size definition for the additional memory space that is to be added.

22. The machine-implemented method of claim 15 wherein:
(b.1) said alteration of at least one of the virtual memory and virtual processor of the target program causes a recording onto a stack portion of the target's virtual processor of a type definition for the additional memory space that is to be added.

23. The machine-implemented method of claim 15 wherein:

(b.1) said alteration of at least one of the virtual memory and virtual processor of the target program includes a writing of new instructions into a subsection of the virtual memory of the target program, where the subsection contains original instructions; and the machine-implemented method further comprises the step of:

(d) after said additional memory space is added to the target's virtual memory, restoring the original instructions to said subsection.

24. The machine-implemented method of claim 15 further comprising the steps of:

(d) after said additional memory space is added to the target's virtual memory, recording a new instruction set into the added memory space; and (e) causing the target program to execute the new instruction set.

25. The machine-implemented method of claim 24 wherein:

(b.1) said new instruction set allows a user to invoke a function that saves data belonging to the target program.

26. The machine-implemented method of claim 24 wherein:

(b.1) said alteration of at least one of the virtual memory and virtual processor of the target program includes a writing of new instructions into a subsection of the virtual memory of the target program, where the subsection contains original instructions; and the machine-implemented method further comprises the step of:

(f) after said additional memory space is added to the target's virtual memory and before the target program is caused to execute the new instruction set, restoring the original instructions to said subsection.

27. A data processing machine having an operating system that assigns respective virtual memories and respective virtual processors to respective ones of plural, multi-tasked programs that execute under supervision of the operating system, said data processing machine comprising:

(a) first means for identifying a first of said multi-tasked programs as a target program to whose respective virtual memory, additional memory space is to be added;

(b) second means for invoking a second of said multi-tasked programs as a control program that alters at least one of the virtual memory and virtual processor of the target program such that a subsequent execution of the target program will cause the respective target program to itself request allocation of the additional memory space to the respective virtual memory of the target program, where said subsequent execution uses at least one of the altered virtual memory and virtual processor; and (c) third means for invoking said subsequent execution of the target program and thereby causing the target program to itself request allocation of the additional memory space to its own virtual memory.

28. The data processing machine of claim 27 wherein:

(a.1) said first means identifies the target program in response to an indication that the target program has experienced a fatal error.

29. The data processing machine of claim 27 wherein:

(a.1) said first means includes a Just In Time (JIT) debugging facility of the operating system.

30. The data processing machine of claim 29 wherein:

(a.2) said JIT debugging facility causes the control program to be stored into a respective virtual memory as a debugger of the identified target program.

31. The data processing machine of claim 27 wherein:

(b.1) said control program alters the at least one of the virtual memory and virtual processor of the target program while the target program is stopped for a first time.

32. The data processing machine of claim 31 wherein:

(b.2) said alteration by the control program of at least one of the virtual memory and virtual processor of the target program causes the target program to stop for a second time after said invocation of the subsequent execution causes the target program to itself request allocation of the additional memory space to its own virtual memory.

33. The data processing machine of claim 27 wherein:

(b.1) said alteration by the control program of at least one of the virtual memory and virtual processor of the target program causes a recording onto a stack portion of the target's virtual processor of a size definition for the additional memory space that is to be added.

34. The data processing machine of claim 27 wherein:

(b.1) said alteration by the control program of at least one of the virtual memory and virtual processor of the target program causes a recording onto a stack portion of the target's virtual processor of a type definition for the additional memory space that is to be added.

35. The data processing machine of claim 27 wherein:

(b.1) said alteration by the control program of at least one of the virtual memory and virtual processor of the target program includes a writing of new instructions into a subsection of the virtual memory of the target program, where the subsection contains original instructions; and (d) after said additional memory space is added to the target's virtual memory, the control program restores the original instructions to said subsection.

36. The data processing machine of claim 27 further comprising:

(d) fourth means for recording a new instruction set into the additional memory space after said additional memory space is added to the target's virtual memory; and (e) fifth means for causing the target program to execute the new instruction set.

37. The data processing machine of claim 36 wherein:

(b.1) said new instruction set allows a user to invoke a function that saves data belonging to the target program.

38. The data processing machine of claim 36 wherein:

(b.1) said alteration by the control program of at least one of the virtual memory and virtual processor of the target program includes a writing of new instructions into a subsection of the virtual memory of the target program, where the subsection contains original instructions; and the data processing machine further comprises:

(f) sixth means for restoring the original instructions to said subsection after said additional memory space is added to the target's virtual memory and before the target program is caused to execute the new instruction set.

39. A data processing machine having an operating system that assigns respective virtual memory spaces to respective ones of plural, multi-tasked programs that execute under supervision of the operating system, said data processing machine comprising:

(a) first means for invoking a first of said multi-tasked programs as a control program that alters a respective virtual memory space of a respective second of said multi-tasked programs such that a subsequent execution of the second program will cause the respective second program to itself request allocation of additional space to the respective virtual memory space of the second program, where said subsequent execution uses the virtual memory space altered by the control program; and (b) second means for invoking said subsequent execution of the second program and thereby causing the second program to itself request allocation of the additional space to its own virtual memory space.

40. A manufactured instructing signal sent to a data processing machine having an operating system that assigns respective virtual memory spaces to respective ones of plural, multi-tasked programs that execute under supervision of the operating system, said instructing signal instructing the data processing machine to perform the steps of:

(a) invoking a first of said multi-tasked programs as a control program that alters a respective virtual memory space of a respective second of said multi-tasked programs such that a subsequent execution of the second program will cause the respective second program to itself request allocation of additional space to the respective virtual memory space of the second program, where said subsequent execution uses the virtual memory space altered by the control program; and (b) invoking said subsequent execution of the second program and thereby causing the second program to itself request allocation of the additional space to its own virtual memory space.

* * * * *

UNITED STATES PATENT AND TRADEMARK OFFICE
CERTIFICATE OF CORRECTION

PATENT NO. : 5,974,249
DATED : October 26, 1999
INVENTOR(S) : Scott Elliott et al.

It is certified that error appears in the above-identified patent and that said Letters Patent is hereby corrected as shown below:

Title page,
Item [75], Line 2, should be -- Teddy, Tigard; both of Oreg. --;
Item [57], the Abstract should be as follows: -- An apparatus and/or computer method are respectively provided for controlling the operation of a computer running under a multitasking operating system such as WINDOWS® 95 or WINDOWS® NT so as to create additional space in a virtual memory of a target program for debugging the target program. This may be done without requiring inclusion of a debugger footprint in all the programs running under the operating system. A program, hereinafter referred to as CrashGuard™, is installed and established as the "debugger" of the user's systems. If a fatal error occurs in the execution of a target program, the "Just in Time" (JIT) debugging facility of the operating system suspends the target program, loads CrashGuard™ as the designated "debugger" into a virtual memory space not allocated to the target program, identifies the target program to CrashGuard™ and initiates execution of CrashGuardTM. CrashGuard™ then causes additional memory space to be added to the virtual memory of the target program. Thereafter CrashGuard™ stores into the additional memory space, a fixing routine that will allow the user to take remedial actions as to execute a Save or Save As command thereby not losing data that would otherwise have been lost if the target program had instead terminated immediately. --

Column 1,
Lines 9-10, replace "an operating system" with -- a multitasking operating system --;
Lines 11-16, replace "the memory space presently allocated to a program running under WINDOWS® 95 or NT (registered Trademark of Microsoft Corporation) operating systems while requiring a zero footprint in programs running under WINDOWS® 95 or NT operating systems, or their like." with --the amount of memory space allocated to a multitasked program that executes while using a corresponding virtual memory. --;
Line 18, replace "a debugging" with -- debugging a --;
Line 19, replace "a program" with -- the program while it is --;
Line 20, replace "WINDOWS® 95 and NT" with -- WINDOWS® 95 or NT --;
Line 24, replace "Further to" with -- To -- and insert a comma (,) after "programs";
Line 25, after "referred to" insert -- herein --;
Line 28, change "register" to -- registers --;
Line 34, change "includes" to -- include --;
Line 40, change "The user has" to -- If a fatal error occurs, the user may have --;
Line 45, change "from being" to -- to be --;

UNITED STATES PATENT AND TRADEMARK OFFICE
CERTIFICATE OF CORRECTION

PATENT NO.  : 5,974,249
DATED       : October 26, 1999
INVENTOR(S) : Scott Elliott et al.

It is certified that error appears in the above-identified patent and that said Letters Patent is hereby corrected as shown below:

Column 1, (con't)
Line 54, before "debugging" insert -- such -- and after "the" insert -- additional --;
Line 59, after "the" insert -- use of a --;
Line 63, change "risk" to -- risks, --;
Line 65, after "other" change "program" to -- programs --.

Column 2,
Lines 3-4, replace "does not require a computer footprint in the programs" with -- do not require inclusion of a debugger footprint into every program --;
Lines 9-10, replace "a computer footprint in the programs" with -- inclusion of a debugger footprint into every program --;
Line 13, change "from being" to -- to be --;
Line 18, replace "Briefly the invention is" with -- Briefly, --;
Line 19, after "method" insert -- in accordance with the invention includes a respective means or step -- and after "computer" insert -- program --;
Lines 21-22, replace "that do not require a footprint in the programs" with -- such that additional virtual memory can be allocated to a target program for storing therein additional code without requiring inclusion of a debugger footprint into every program --;
Line 23, replace "A" with -- In accordance with the invention, a --;
Lines 24-25, replace "thereby being" with -- so as to be --;
Line 27, change "then" to -- than --, and replace "occurs" with -- occurs, a --;
Line 31, replace "not" with -- other than that --;
Line 32, replace "identifies" with -- will identify --;
Line 33, replace "executes" with -- will initiate execution of --;
Line 43, replace "is not used" with -- does not have to be consumed -- and replace "any" with -- every --;
Lines 56-57, replace "program 2 by the invention; and" with -- the virtual memory area of an exemplary PROGRAM _2 using a memory expansion mechanism in accordance with the invention; --;
Line 59, replace the period (.) with -- ; and --

UNITED STATES PATENT AND TRADEMARK OFFICE
CERTIFICATE OF CORRECTION

PATENT NO. : 5,974,249
DATED : October 26, 1999
INVENTOR(S) : Scott Elliott et al.

It is certified that error appears in the above-identified patent and that said Letters Patent is hereby corrected as shown below:

Column 3,
Line 8, replace "virtual memory 30" with -- virtual memory 31 --;
Line 10, replace "referred to" with -- referred to herein -- and replace each instance of "virtual processor 31" with -- virtual processor 30 --;
Line 12, change "register" to -- registers --;
Line 18, change "includes" to -- include --;
Line 22, replace "then collects" with -- will then collect --;
Line 24, replace "running" with -- that is used in the running of --;
Line 26, change "Disk 14" to -- In Fig. 1, disk 14 --;
Lines 43-44, replace "FIG. 3 illustrates the RAM 15 having stored therein the operating system 32 stored in virtual memory 20," with -- FIG. 3 illustrates a first version of the RAM 15 with the operating system 32 stored therein in a first virtual memory 20. --;
Lines 44-46, replace "programs 1 through N stored in virtual memories 21, 22, 23 and 24 and unallocated memory space 25" with -- Unaltered programs 1 through N are shown respectively stored in virtual memories 21, 22, 23 and 24. RAM 15 is further shown to have an unallocated memory space 25 --;
Lines 47-51, replace "FIG. 2 illustrates RAM 15 having stored therein the operating system stored in virtual memory 20, program 1 through N each having a debugger footprint 21a through 24a stored in virtual memories 21, 22, 23 and 24 and unallocated memory space 25." with -- FIG. 2 illustrates a second version 15' of the RAM with the operating system stored in virtual memory 20. Modified programs 1 through N are shown as respectively each having an added debugger footprint 21a' through 24a' stored in the corresponding virtual memories 21', 22', 23' and 24'. The second version 15' of the RAM also has an unallocated memory space 25'. --;
Lines 58-59, replace "its own virtual memory of RAM 15 and thereby isolated from the virtual memory for the target program." with -- its own virtual memory 26" (Fig. 4) of RAM third version 15". The so-stored CrashGuard™ 33 is thereby isolated from the virtual memory for the target program 22". --;
Lines 59-63, replace "As such CrashGuard™ 33 can modify target program instructions stored in the virtual memory 31 for the target program but cannot add additional memory space to the virtual memory 31 allocated to the target program." with -- From this isolated environment, CrashGuard™ 33 can still modify target program instructions (e.g. in area 22b" of Fig. 4) stored in the virtual memory 31 for the target program even though CrashGuard™ cannot by itself add additional memory space (e.g. 22a" of Fig. 4) to the virtual memory 31 allocated to the target program. --;

UNITED STATES PATENT AND TRADEMARK OFFICE
CERTIFICATE OF CORRECTION

PATENT NO. : 5,974,249
DATED : October 26, 1999
INVENTOR(S) : Scott Elliott et al.

It is certified that error appears in the above-identified patent and that said Letters Patent is hereby corrected as shown below:

Column 4,
Line 1, replace "In step 101 JIT calls CrashGuard™ 33 into RAM 17" with -- In step 101 JIT calls CrashGuard™ 33 into an area (e.g., 26" of Fig. 4) of the system RAM 15" --;
Line 3, replace "will acquire" with -- determines --;
Line 5, replace "will execute" with -- executes --;
Lines 9-11, replace "then resumes execution the target program such that the target program will cause the additional memory space to be allocated to the target program's virtual memory 31." with -- then cause a resumption of the execution of the target program. The so altered and resumed target program will on its own cause the additional memory space to be allocated to the target program's virtual memory 31. --;
Line 11, begin a new paragraph with "One such memory allocation routine,";
Lines 18-20, replace "copy first n bytes of the target virtual memory 31 to be temporarily stored." with -- copy these first n bytes of the target virtual memory 31 to temporary storage --;
Line 21, replace "program" with -- programs -- and replace "after the programs" with -- after each such program --;
Line 25, after "program." add -- Such first n bytes are represented in Fig. 4 by subregion 22b" of target PROGRAM-2. --;
Line 26, change "ROUTINE A will" to -- After temporarily storing the original 11 bytes, ROUTINE A will --;
Line 44, replace "first instruction of" with -- first instruction --;
Lines 52-54, replace "These instructions will store the number of bytes requested, the type of memory request (global) and will then will call" with -- These instructions will define the number of bytes requested, the type of memory request (global) and will then call --;
Line 66, replace "interrupted" with -- interpreted --;
Line 67, replace "and will transferred control over ROUTINE A" with -- and will transfer control back over to ROUTINE A --.

Column 5,
Line 2, change "15" to -- 15" -- and change "recognized" to -- recognize --;
Line 4, change "store in the target" to -- previously stored in the target --;
Lines 12-13, replace "ROUTINE A then store the original 11 bytes" with -- ROUTINE A then writes the original 11 bytes --;
Line 20, replace "modify's" with -- modifies --;
Line 42, replace "addition" with -- additional --;

UNITED STATES PATENT AND TRADEMARK OFFICE
CERTIFICATE OF CORRECTION

PATENT NO. : 5,974,249
DATED : October 26, 1999
INVENTOR(S) : Scott Elliott et al.

It is certified that error appears in the above-identified patent and that said Letters Patent is hereby corrected as shown below:

Column 5, (con't.)
Lines 47-48, change "and not the target program which would normally be the case. The DebugBreak" to -- and not to the target program as would normally be the case. The pointed-to DebugBreak --;
Line 49, change "interrupted" to -- seen --;
Lines 50-51, replace "control over ROUTINE B" with -- control over to ROUTINE B --;
Line 52, replace "15" with -- 15" --;
Line 56, replace "15" with -- 15" --;
Line 57, replace "additional memory space" with -- additional memory space 22a" --;
Lines 60-61, replace "target program that code" with -- target program's virtual memory space 22" that code --.

Column 6,
Line 4, replace "new memory space" with -- newly allocated memory space 22a" --;
Line 25, replace "users data" with -- user's data --;
Line 30, replace "the" with -- then --.

Column 7,
Line 45, replace "fit" with -- first --;
Line 63, replace "fit" with -- first --.

Signed and Sealed this

Sixth Day of November, 2001

*Attest:*

*Attesting Officer*

NICHOLAS P. GODICI
*Acting Director of the United States Patent and Trademark Office*